United States Patent

Singh et al.

Patent Number: 5,742,428
Date of Patent: Apr. 21, 1998

[54] CRYSTALS FOR ULTRAVIOLET LIGHT FILTERS

[75] Inventors: Narsingh B. Singh; William D. Partlow, both of Export, Pa.; Steven Strauch, Ellicott City, Md.; Albert M. Stewart, Pittsburgh; John F. Jackovitz, Monroeville, both of Pa.; David W. Coffey, Columbia, Md.; Robert Mazelsky; James D.B. Smith, both of Monroeville, Pa.

[73] Assignee: Northrop Grumman Corporation, Los Angeles, Calif.

[21] Appl. No.: 724,605

[22] Filed: Sep. 30, 1996

[51] Int. Cl.$^6$ .............................. G02B 1/02; G02B 5/22; F21V 9/06
[52] U.S. Cl. .................... 359/350; 250/372; 252/588
[58] Field of Search ........................ 359/350; 250/372; 252/588

[56] References Cited

U.S. PATENT DOCUMENTS 3,624,000  11/1971  Throckmorton ................ 502/117
5,134,518   7/1992  Letter ............................ 359/350

OTHER PUBLICATIONS

"Low-temperature Optical Absorption of Nickel Fluosilicate Crystals" by M. H. L. Pryce, G. Agnetta, T. Carofano, M. B. Palma-Vittorelli and M. U. Palma, *Phil. Mag.*, 10, 477-496 (1964).

"Derivatographic Studies on Dehydration of Salt Hydrates and Their Deuterium Oxide Analogues, II" by N. Ray Chaudhuri and G. K. Pathak, *Thermochimica Acta*, 12 (1975) 71-79.

*Primary Examiner*—Jon W. Henry
*Attorney, Agent, or Firm*—Walter G. Sutcliff

[57] ABSTRACT

Crystals formed of a solid-solution of $Ni(BF_4)_2 6H_2O$ provide very good materials for filtering ultraviolet light and will not deteriorate in temperatures as high as 110° C. They are particularly useful in sensing devices which seek to identify the presence of ultraviolet light in the UV missile warning band.

4 Claims, 2 Drawing Sheets

CRYSTALS FOR ULTRAVIOLET LIGHT FILTERS

FIELD OF INVENTION

The invention relates to crystals having thermal and optical properties suitable for use in ultraviolet light filters and sensors.

BACKGROUND OF THE INVENTION

There are a variety of devices which use ultraviolet (UV) light filters that allow selected wavelengths of light to pass therethrough. Such filters are used in missile approach warning systems which locate and track sources of ultraviolet energy, enabling the system to distinguish the plume of an incoming missile from other UV sources that pose no threat. The benefit of this system is the ability to estimate missile range and closing velocity to time the ejection of flare-decoys to maximize their effectiveness against infrared-guided missiles. This system can be also used to aim a beam of infrared energy at an IR-guided missile to confuse its guidance system.

The success and efficiency of the system for helicopters or transport-type aircraft depends on the UV sensors. Commercially available nickel sulfate hexahydrate crystals are widely used for these sensors. The biggest problem for these sensors arises due to low thermal stability of nickel sulfate crystals. The crystals start deteriorating as the temperature starts rising above 60° C. This rise can be due to atmosphere as well as heat generated by working systems in the aircraft. Aircraft parked in tropical and desert areas can experience very high temperatures. In such heat the stability of these systems is very questionable. There is an urgent need for an ultraviolet filter material with higher temperature stability, good crystal growth suitability, and desired filter transmittance and bandwidths.

The filter should have high transmittance at the desired wavelength. For missile warning systems, the crystal should be transmissive in the ultraviolet spectral region and have strong absorption at longer wavelengths. Furthermore, the crystal should be able to survive prolonged exposures to temperatures above 85° C. and preferably not be adversely affected by temperatures in the range 100° C. to 115° C.

In 1964, H. L. Pryce et al. published their article "Low-Temperature Optical Absorption of Nickel Flourosilicate Crystals," Phil. Mag. 10,477 (1964). The article presents data for the light spectrum which will be transmitted through a $NiSiF_6 6H_2O$ crystal, but contains no information about temperature stability. That data indicates that a crystal made from $NiSiF_6 6H_2O$ will not transmit an ultraviolet light in the wavelengths required for a missile warning system. Consequently, the art has not considered making a $NiSiF_6 6H_2O$ crystal which will pass ultraviolet light bands below 300 nm and block ultraviolet light around 385 nm. However, in 1994 researchers at Westinghouse Electric Corporation discovered that $NiSiF_6 6H_2O$ crystals could be made to have the desired optical properties, rather than the properties described by Pryce et al. The methods used to produce such crystals is the subject of U.S. patent application Ser. No. 08/709,399, filed Aug. 30, 1996. Prior to the present invention, the art has not recognized that hydrated nickel fluoroborate crystals could be made which have the desired thermal stability and light transmission properties.

SUMMARY OF THE INVENTION

We provide a crystal comprised of hydrated nickel fluroborate $Ni(BF_4)_2 6H_2O$. We have found that $Ni(BF_4)_2 6H_2O$ crystals are stable in temperatures up to 115° C. for indefinite periods. Sufficiently large crystals can be grown that are very useful for UV filters of the type used in missile approach warning systems. Crystals of $Ni(BF_4)_2 6H_2O$ have been successful at withstanding 110° C. to 115° C. for indefinite periods of time under relevant operating conditions and survived at temperatures as high as 130° C. for short periods. The crystal also has the required optical properties, including strong absorption at longer wavelengths. It remains transmissive in the UV band.

The crystals can be grown using a saturated solution of $Ni(BF_4)_2 6H_2O$.

Other objects and advantages of the present invention will become apparent from a description of certain preferred embodiments thereof shown in the accompanying drawings:

DESCRIPTION OF THE PREFERRED EMBODIMENTS

We provide a $Ni(BF_4)_2 6H_2O$ crystal useful for ultraviolet sensors and filters. Single crystals of $Ni(BF_4)_2 6H_2O$ were grown by solution growth method.

As supplied, $Ni(BF_4)_2 6H_2O$ was dissolved in water. A saturated solution was prepared at 45° C. by adding $Ni(BF_4)_2 6H_2O$ in water. We used 300 ml water for the solvent. This volume can be changed depending on the size of container. After we prepared the saturated solution, we decanted it into a container which was already maintained at 35° C. We used a small pregrown seed crystal for the nucleating. The bath temperature was lowered from 35° C. to 30° C. in 100 hours. The crystal grew on the seed to a size of approximately 1.5 centimeters. Then, we removed the crystal from the solution.

Those skilled in the art will recognize that the times and temperatures which are used in the method could be varied. However, we prefer to use a temperature with plus or minus 0.1° C. of that stated. Higher temperatures enable more starting material to be dissolved, but the water evaporates more rapidly. The dominant concern is to create a solution containing enough material to form a crystal of a desired size.

Figure 1:
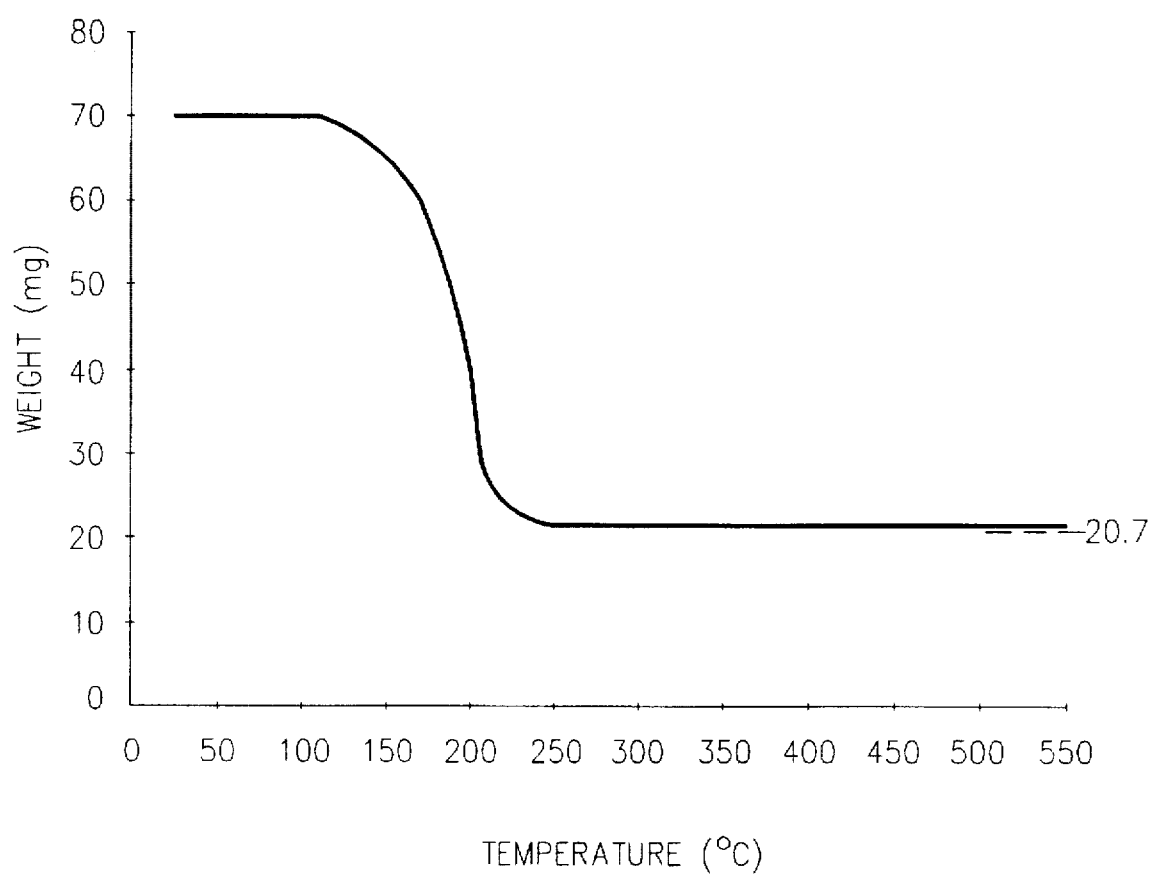
FIG. 1 is a chart showing thermogravimetric analysis for our $Ni(BF_4)_2 6H_2O$ crystal.

The crystal composition was confirmed by matching the x-ray lines. We did not observe any additional phases in grown crystal. The lattice parameters of the crystal were:

a=15.33 Angstrom b=5.17 Angstrom and the crystal had hexagonal symmetry. Thermogravimetric analysis was carried out to determine the stability of the crystal. We used a heating rate of 5° C. per minute in our experiment. The results are shown in FIG. 1. It is clear that the crystal did not start losing water before 110° C. Therefore, the crystal and devices made from the crystal can be expected to perform in temperatures below 110° C. Also, we carried out an independent test by placing the crystal in an oven maintained at 90° C.±5° C. We did not observe any sign of deterioration up to 48 hours at that temperature.

Figure 2:
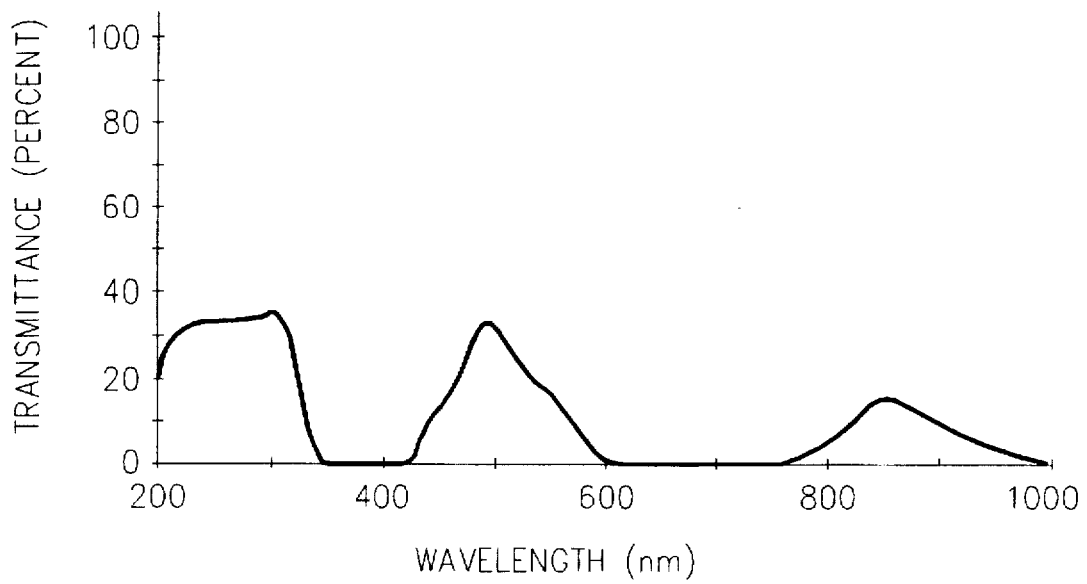
FIG. 2 is an ultraviolet light transmission curve for our $Ni(BF_4)_2 6H_2O$ crystal.

The feasibility of desired transmission was evaluated by measuring the transmission of an $Ni(BF_4)_2 6H_2O$ crystal using a Varian Cray-5 spectrophotometer. The results are shown in FIG. 2 and indicate that the $Ni(BF_4)_2 6H_2O$ crystal is transparent in the ultraviolet range and absorptive at longer wavelengths. Based upon this data, it is apparent that this crystal can be used in UV filters and sensors for missile warning systems. We attribute the optical properties to the fact that nickel is present in a cluster with six waters of hydration. It should, therefore, be possible to substitute other fluorocompounds, such as flourostannate $(Sn\ F_6)^{2-}$, for fluoroborate and still achieve substantially the same optical properties.

Figure 3:
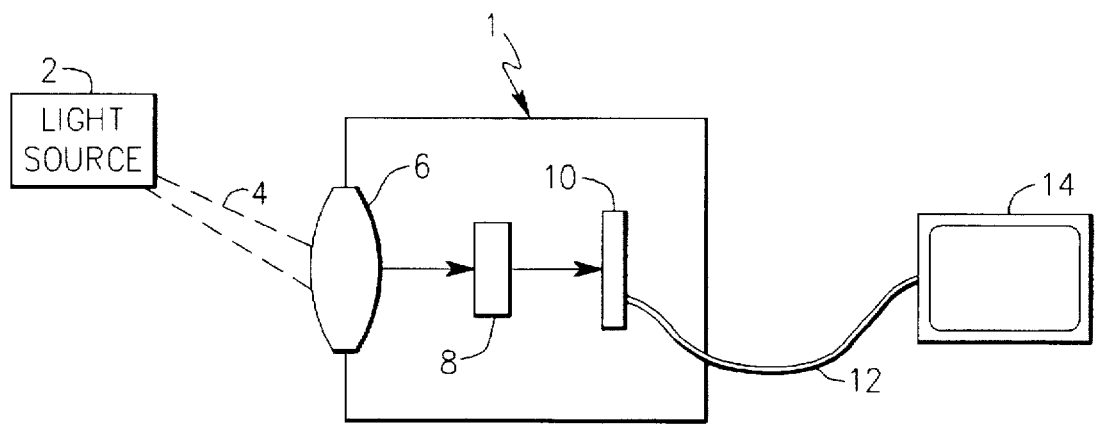
FIG. 3 is a diagram of a sensor device which uses the crystal.

FIG. 3 is a diagram of a sensing device 1 which utilizes the crystal of the present invention. A source of ultraviolet light 2 emits or reflects a beam of ultraviolet light 4 to the sensing device. The sensing device has an optical system 6 which directs the light to the crystal 8. The optical system 6 may be a single lens as shown in the figure or a series of lenses together with reflectors and filters. Typically, filters comprised of organic dyes in a polyvinyl alcohol plastic are used in this type of system. The beam of ultraviolet light strikes the $Ni(BF_4)_2 6H_2O$ crystal 8, which permits passage of ultraviolet light rays having the required wavelengths. The transmitted ultraviolet light strikes a sensor 10 which generates a signal indicating the presence of the ultraviolet light. That signal is transmitted through wire 12 to an alarm or display device 14. The size of the crystal 8 will depend upon the particular sensing device. In a missile approach warning system a crystal of approximately one centimeter in thickness is used.

Although we have described certain present preferred embodiments of our crystal, methods of making the crystal and devices which utilize that crystal, it should be distinctly understood that our invention is not limited thereto, but may be variously embodied within the scope of the following claims.

We claim:

1. An ultraviolet light filter comprising a single crystal of the formula $Ni(BF_4)_2 6H_2O$ which is stable above 85° C. and transmits ultraviolet light in a missile warning band and blocks light at longer wavelengths.

2. The filter of claim 1 having a diameter of at least 1.5 cm.

3. An improved ultraviolet light sensing device of the type having a crystal which is stable above 85° C. and permits passage of ultraviolet light through the crystal and a means for generating a signal responsive to ultraviolet light passing through the crystal wherein the improvement comprises the crystal having a formula $Ni(BF_4)_2 6H_2O$.

4. The improved ultraviolet light sensing device of claim 3 wherein the device is a missile approach warning system.

* * * * *